US011108088B2

(12) United States Patent
Morita

(10) Patent No.: US 11,108,088 B2
(45) Date of Patent: Aug. 31, 2021

(54) LAMINATE-TYPE BATTERY PRODUCTION METHOD

(71) Applicant: TOYOTA JIDOSHA KABUSHIKI KAISHA, Toyota (JP)

(72) Inventor: Keisuke Morita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 16/512,766

(22) Filed: Jul. 16, 2019

(65) Prior Publication Data
US 2020/0067141 A1    Feb. 27, 2020

(30) Foreign Application Priority Data

Aug. 22, 2018 (JP) .............................. JP2018-155578

(51) Int. Cl.
*H01M 10/0585* (2010.01)
*H01M 10/04* (2006.01)

(52) U.S. Cl.
CPC ... *H01M 10/0585* (2013.01); *H01M 10/0436* (2013.01); *H01M 10/0472* (2013.01); *H01M 10/0477* (2013.01)

(58) Field of Classification Search
CPC . H01M 10/04; H01M 10/0413; H01M 10/058
USPC .................................. 29/623.1, 623.3, 623.5
See application file for complete search history.

(56) References Cited

U.S. PATENT DOCUMENTS 6,096,455 A * 8/2000 Satake .................... H01M 4/70
                                                              429/241
2010/0035151 A1   2/2010 Takahashi

FOREIGN PATENT DOCUMENTS

| JP | 2003-086232 A | 3/2003 |
| JP | 2008-053102 A | 3/2008 |
| JP | 2011-103279 A | 5/2011 |
| JP | 4943025 B2 * | 5/2012 |

OTHER PUBLICATIONS

Machine Translation of JP 4943025B2 printing on May 30, 2012 (Year: 2012).*

* cited by examiner

*Primary Examiner* — Maria Laios
*Assistant Examiner* — Jordan E Berresford
(74) *Attorney, Agent, or Firm* — Oliff PLC

(57) ABSTRACT

A method produces a laminate-type battery which can suppress short-circuiting even when a positioning guide is used. The method for producing a laminate-type battery having a first current collector layer, a first active material layer, a solid electrolyte layer or a separator layer, a second active material layer, and a second current collector layer laminated in this order, the method includes arranging a first layer along a first contact surface of a positioning guide, rotating the positioning guide, and thereafter arranging a second layer on the arranged first layer along a second contact surface of the positioning guide. The first layer and the second layer are different from each other and include an arbitrary layer selected from the first current collector layer, the first active material layer, the solid electrolyte layer or the separator layer, the second active material layer, and the second current collector layer.

14 Claims, 2 Drawing Sheets

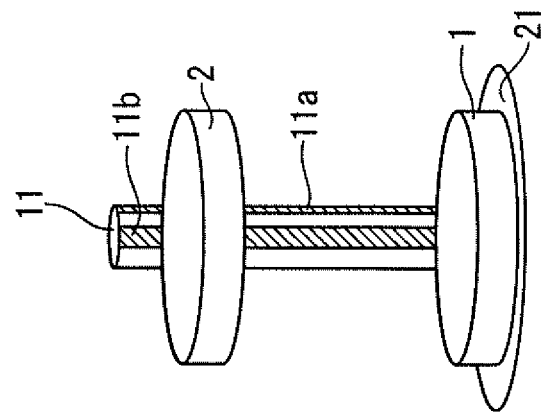
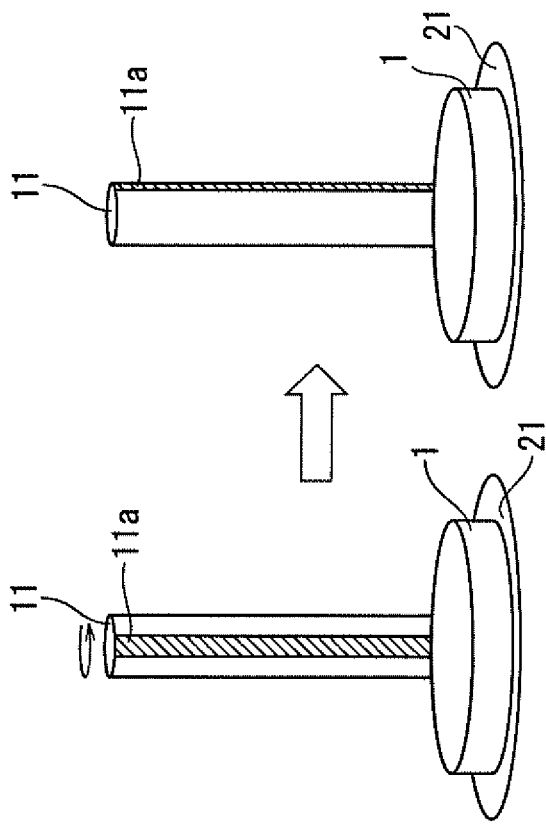
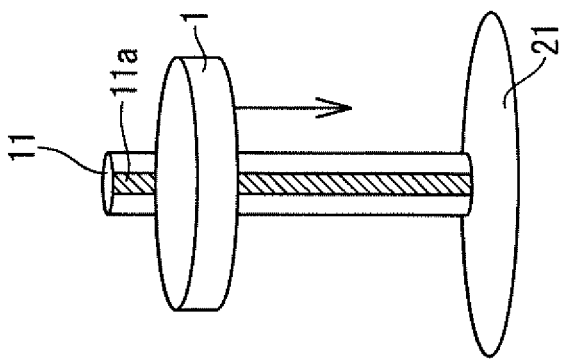

LAMINATE-TYPE BATTERY PRODUCTION METHOD

FIELD

The present disclosure relates to a method for producing a laminate-type battery.

BACKGROUND

In recent years, with the rapid spread of information-related devices and communication devices such as personal computers, video cameras, mobile phones, etc., the development of laminate-type batteries, which are used as the power sources thereof, has been regarded as important.

For example, Patent Literature 1 discloses a method for producing an all-solid-state battery comprising: positioning projections provided on a case which houses a charging and discharging part; and holes through which the positioning projections can be inserted into electrodes, which are the constituent elements of the charging and discharging part, the method comprising a step in which the constituent elements of the charging and discharging part are laminated along the positioning projections.

Patent Literature 2 discloses a method for producing a fuel cell stack (laminate), in which unit cells are laminated using a positioning guide, and thereafter, the positioning guide is removed.

Patent Literature 3 discloses a storage battery device including a laminate in which a positive electrode and a negative electrode are laminated via an electrolyte, wherein a positioning member is inserted into a positioning hole formed in the laminate so as to penetrate therethrough in the lamination direction.

CITATION LIST

Patent Literature

[PTL 1] Japanese Unexamined Patent Publication (Kokai) No. 2011-103279
[PTL 2] Japanese Unexamined Patent Publication (Kokai) No. 2003-086232
[PTL 3] Japanese Unexamined Patent Publication (Kokai) No. 2008-053102

SUMMARY

Technical Problem

Laminating a current collector layer, an active material layer, and a solid electrolyte layer or separator to produce a laminate-type battery has been proposed, as described above.

However, when laminating the active material layer and solid electrolyte layer, the materials constituting these layers may dislodge and become adhered to the positioning guide. When such material adheres to the positioning guide, the material can then adhere to the next layer to be laminated, which may cause short-circuiting.

The present disclosure has been conceived of in light of the above problems, and aims to provide a method for producing a laminate-type battery with which short-circuiting can be suppressed when producing a laminate-type battery using a positioning guide.

Solution to Problem

The inventors of the present disclosure have discovered that the object described above can be achieved by the following means.

<Aspect 1>

A method for producing a laminate-type battery comprising a first current collector layer, a first active material layer, a solid electrolyte layer or a separator layer, a second active material layer, and a second current collector layer laminated in this order, the method comprising:

arranging a first layer along a first contact surface of a positioning guide, rotating the positioning guide, and thereafter arranging a second layer on the arranged first layer along a second contact surface of the positioning guide, wherein the first layer and the second layer are different from each other and comprise an arbitrary layer selected from the first current collector layer, the first active material layer, the solid electrolyte layer or the separator layer, the second active material layer, and the second current collector layer.

<Aspect 2>

The method according to Aspect 1, wherein at least one of the first layer and the second layer is a laminate of the first current collector layer and the first active material layer or a laminate of the second current collector layer and the second active material layer.

<Aspect 3>

The method according to Aspect 1, comprising arranging the first layer, the second layer, and a third layer along the positioning guide in this order, wherein the first layer is arranged along the first contact surface of the positioning guide, and the positioning guide is rotated, thereafter the second layer is arranged on the arranged first layer along the second contact surface of the positioning guide, and the positioning guide is rotated, subsequently the third layer is arranged on the arranged second layer along a third contact surface of the positioning guide, and wherein the third layer is different from the first layer and the second layer, and comprises an arbitrary layer selected from the first current collector layer, the first active material layer, the solid electrolyte layer or the separator layer, the second active material layer, and the second current collector layer.

<Aspect 4>

The method according to Aspect 3, wherein the first layer is a laminate of the first current collector layer and the first active material layer, the second layer is the solid electrolyte layer or the separator layer, and the third layer is a laminate of the second current collector layer and the second active material layer.

<Aspect 5>

The method according to any one of Aspects 1 to 4, further comprising cleaning the contact surfaces of the positioning guide.

<Aspect 6>

The method according to Aspect 5, wherein the cleaning is carried out by a contact method or a non-contact method.

<Aspect 7>

The method according to any one of Aspects 1 to 6, wherein two or more positioning guides are used.

<Aspect 8>

The method according to any one of Aspects 1 to 7, wherein three positioning guides are used.

<Aspect 9>

The method according to any one of Aspects 1 to 8, wherein the positioning guide is mounted on a bottom plate, and the positioning guide and the bottom plate form a part of a case of the laminate-type battery.

Advantageous Effects of Invention

According to the method for producing a laminate-type battery of the present disclosure, short-circuiting can be suppressed even when a positioning guide is used.

BRIEF DESCRIPTION OF DRAWINGS

FIGS. 1A, 1B, and 1C are conceptual views showing an embodiment of the method of the present disclosure.

DESCRIPTION OF EMBODIMENTS

Figure 2C:
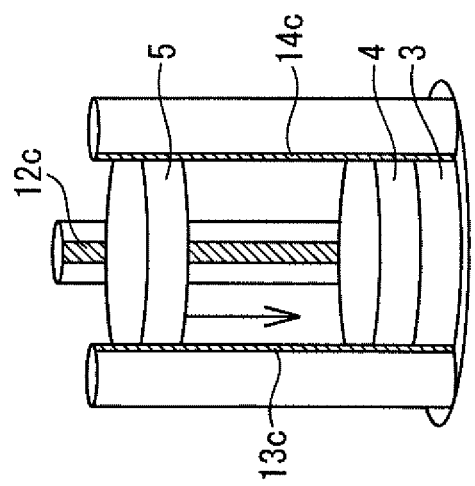
FIGS. 2A, 2B, and 2C are conceptual views showing another embodiment of the method of the present disclosure.

The embodiments of the present disclosure will be described in detail below with reference to the drawings. Note that, for the ease of explanation, in the drawings, identical or corresponding portions have been assigned the same reference signs, and duplicate explanations thereof have been omitted. Not all of the constituent elements of the embodiments are necessarily indispensable, and some of the constituent elements may be omitted in some cases. The embodiments depicted in the drawings below are merely examples of the present disclosure and do not limit the present disclosure.

<<Laminate-Type Battery Production Method>>

The laminate-type battery production method of the present disclosure is a method for producing a laminate-type battery comprising a first current collector layer, a first active material layer, a solid electrolyte layer or a separator layer, a second active material layer, and a second current collector layer laminated in this order, the method comprising:

arranging a first layer along a first contact surface of a positioning guide, rotating the positioning guide, and thereafter arranging a second layer on the arranged first layer along a second contact surface of the positioning guide, wherein the first layer and the second layer are different from each other and comprise an arbitrary layer selected from the first current collector layer, the first active material layer, the solid electrolyte layer or the separator layer, the second active material layer, and the second current collector layer.

Furthermore, in the present disclosure, the "contact surface" of the positioning guide is the surface of the positioning guide which is contacted when the first layer, second layer, or optional third layer is arranged along the positioning guide. Thus, the "first contact surface", "second contact surface", and "third contact surface" are the surfaces of the positioning guide which are contacted when the respective layers are arranged along the positioning guide. These contact surfaces may be different regions of the surface of the positioning guide, or when cleaning of the contact surfaces of the positioning guide is further included, may be regions which are the same as the cleaned contact surfaces or regions which partially overlap. More specifically, for example, the "first contact surface", "second contact surface", and "third contact surface" may be different regions of the surface of the positioning guide. Additionally, for example, the cleaned "first contact surface" and "second contact surface" may be the same region of the surface of the positioning guide, or may be regions which partially overlap. Furthermore, when layers or laminates having the same structure are repeatedly arranged at different timings, the layers or laminates having the same structure can be arranged together on the same contact surface.

The "first layer", "second layer", and "third layer" may each comprise only a single layer or may comprise a laminate consisting of two or more single layers.

In the present disclosure, the term "arrange" encompasses the meaning of the term "laminate". Furthermore, "arrange along the positioning guide" may simply be referred to as "arrange."

The degree of rotating the positioning guide is not particularly limited, and may be a rotation of, for example, 10° or more, 20° or more, 40° or more, 60° or more, 80° or more, 100° or more, 120° or more, 140° or more, 160° or more, or 180° or more, and may be a rotation of 350° or less, 340° or less, 320° or less, 300° or less, 280° or less, 260° or less, 240° or less, 220° or less, 200° or less, or 180° or less around the longitudinal axis of the positioning guide.

As described above, when producing a laminate-type battery by laminating a current collector layer, an active material layer, and a solid electrolyte layer or separator using a positioning guide, there is a problem in that the materials constituting the active material layer and the solid electrolyte layer may dislodge during lamination, becoming adhered to the positioning guide, and as a result, may become adhered to the layer laminated next, whereby short-circuiting occurs.

In connection thereto, the method of the present disclosure comprises arranging the first layer along the first contact surface of the positioning guide, rotating the positioning guide, and thereafter arranging the second layer on the arranged first layer along the second contact surface of the positioning guide. By rotating the positioning guide in this manner, even if material from the first layer arranged along the first contact surface of the positioning guide becomes adhered to the first contact surface of the positioning guide, since the second layer is arranged along the second contact surface of the positioning guide, the material from the first layer adhered to the first contact surface does not adhere to the second layer. Thus, in the method of the present disclosure, the occurrence of short-circuiting can be suppressed.

Furthermore, since each layer or laminate is arranged using the positioning guide, the method of the present disclosure can prevent misalignment of the layers or laminates.

Note that the method of the present disclosure may include the arrangement of another layer in addition to the first layer and the second layer. In this case, it is only necessary that the positioning guide be rotated between the arrangement of the first layer and the arrangement of the second layer. Between the arrangement of the other layer and the arrangement of the first layer, or between the arrangement of the second layer and the arrangement of the other layer, the positioning guide may be rotated or may not be rotated. However, from the viewpoint of more effectively exhibiting the effect of the present disclosure, it is preferable that the positioning guide be rotated between the arrangement of the other layer and the arrangement of the third layer or between the arrangement of the second layer and the arrangement of the other layer. In other words, it is preferable that the arrangement of an arbitrary layer or laminate and the rotation of the positioning guide be repeatedly performed.

FIGS. 1A, 1B, and 1C are conceptual views showing an embodiment of the method of the present disclosure. As shown in FIG. 1A, a first layer 1 is arranged along a first contact surface 11a of a positioning guide 11, which is mounted on a bottom plate 21. Next, as shown in FIG. 1B, the positioning guide 11 is rotated. Thereafter, as shown in FIG. 1C, a second layer 2 is arranged on the arranged first layer 1 along a second contact surface 11b of the positioning guide 11. By arranging each of the layers in this manner, a laminate-type battery can be produced. Thus, even if material from the first layer 1 dislodges and becomes adhered to the first contact surface 11a of the positioning guide 11, since the second layer 2 is arranged along the second contact surface 11b of the positioning guide 11, adhesion of the material from the first layer 1, which has adhered to the first contact surface 11a, to the second layer 2 can be suppressed. Thus, the occurrence of short-circuiting can be suppressed. Furthermore, since the positioning guide 11 is used, the first layer 1 and the second layer 2 can be arranged without misalignment.

Note that though a bottom plate 21 is used in FIGS. 1A, 1B, and 1C, after arrangement of each of the layers, the bottom plate 21 may be removed along with the positioning guide 11, or the bottom plate 21 may form a part of the case of the laminate-type battery as-is along with the positioning guide 11.

Furthermore, the first active material layer, the second active material layer, and the solid electrolyte layer can each be formed by compacting (press-forming) the structural material thereof.

In the present disclosure, at least one of the first layer and the second layer may be a laminate of the first current collector layer and the first active material layer or the second current collector layer and the second active material layer.

For example, the first layer can be a laminate of the first current collector layer and the first active material layer. In this case, the second layer can be the solid electrolyte layer or the separator layer. Further, a third layer can be arranged on the arranged solid electrolyte layer or separator layer. In this case, the third layer may be the second active material layer, or may be a laminate of the second active material layer and the second current collector layer. Note that when the third layer is the second active material layer, another layer (e.g., the second current collector layer) can be further arranged thereon.

From the viewpoint of more effectively exhibiting the effect of the present application, it is preferable that the method of the present invention comprise arranging the first layer, the second layer, and the third layer along the positioning guide in this order, wherein the first layer is arranged along the first contact surface of the positioning guide, and the positioning guide is rotated, thereafter the second layer is arranged on the arranged first layer along the second contact surface of the positioning guide, and the positioning guide is rotated, and subsequently the third layer is arranged on the arranged second layer along the third contact surface of the positioning guide. In this case, the third layer is different from the first layer and the second layer, and comprises an arbitrary layer selected from the first current collector layer, the first active material layer, the solid electrolyte layer or separator layer, the second active material layer, and the second current collector layer. Note that from the viewpoint of operational convenience, it is preferable that the first layer be a laminate of the first current collector layer and the first active material layer, the second layer be the solid electrolyte layer or the separator layer, and the third layer be a laminate of the second current collector layer and the second active material layer.

Figure 2B:
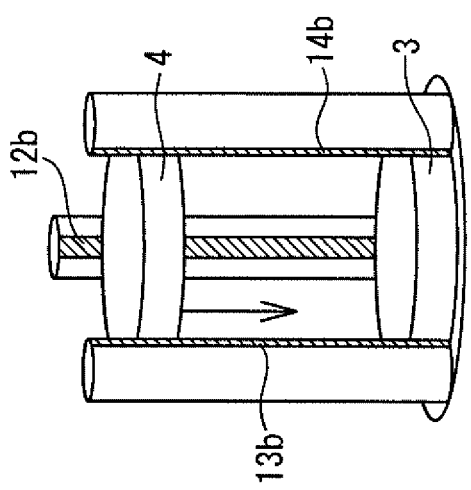
Figure 2A:
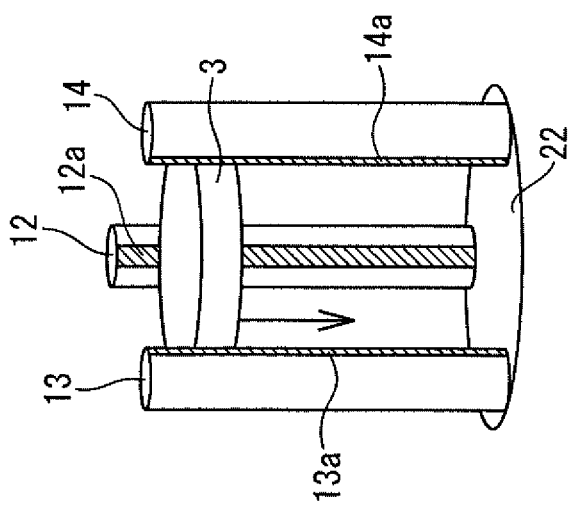

For example, FIGS. 2A, 2B, and 2C are conceptual views showing another embodiment of the method of the present disclosure. As shown in FIG. 2A, a laminate 3 of the first current collector layer and the first active material layer is arranged along first contact surfaces 12a, 13a, and 14a of the three respective positioning guides 12, 13, and 14, which are mounted on a bottom plate 22. Next, as shown in FIG. 2B, the positioning guides 12, 13, and 14 are rotated, and a solid electrolyte layer 4 is then arranged along second contact surfaces 12b, 13b, and 14b of the respective positioning guides 12, 13, and 14. Thereafter, as shown in FIG. 2C, the positioning guides 12, 13, and 14 are rotated, and then a laminate 5 of the second current collector layer and the second active material layer is arranged along third contact surfaces 12c, 13c, and 14c of the respective positioning guides 12, 13, and 14. By repeatedly arranging a layer and rotating the positioning guides in this manner, the desired laminate-type battery can be produced.

Note that though the bottom plate 22 and the three positioning guides 12, 13, and 14 are used in FIGS. 2A, 2B, and 2C, after arrangement of each of the laminates and layers, the bottom plate 22 may be removed along with the three positioning guides 12, 13, and 14, or the bottom plate 22 may form a part of a case of the laminate-type battery as-is along with the three positioning guides 12, 13, and 14.

Furthermore, the laminate of the first current collector layer and the first active material layer may be formed by forming the first active material layer on the first current collector layer, or may be formed by laminating a formed first active material layer on the first current collector layer.

Likewise, the laminate of the second current collector layer and the second active material layer may be formed by forming the second active material layer on the second current collector layer, or may be formed by laminating a formed second active material layer on the second current collector layer.

<Cleaning>

The method of the present application can further comprise cleaning the contact surfaces of the positioning guide. In other words, the method can further comprise cleaning the first contact surface after the first layer has been arranged along the first contact surface of the positioning guide, prior to arranging the second layer on the arranged first layer, and either prior to or after rotating the positioning guide. As a result, material which has become dislodged from the first layer and which has adhered to the first contact surface can be removed. Thus, in subsequent operations, the second contact surface may be a region on the surface of the positioning guide which is the same as the first contact surface, or may be a region which partially overlaps with the first contact surface.

Furthermore, the cleaning can be performed by a contact method or a non-contact method.

Examples of cleaning by a contact method include a method of wiping with a cloth, a method of contacting with a tacky substance, and a method of contact-type suctioning. However, the cleaning by a contact method is not limited thereto.

Examples of cleaning by a non-contact method include a method of adsorption with static electricity, a method of blowing gas, or a method of non-contact suction. However, the cleaning by a non-contact method is not limited thereto.

<Positioning Guide>

In the method of the present disclosure, at least one positioning guide is used. From the viewpoint of effectively preventing misalignment between layers, it is preferable that two or more positioning guides be used, and it is more preferable that three or more positioning guides be used. From the viewpoint of labor and practicality of rotation of the positioning guides, it is preferable that five or fewer, four or fewer, or three or fewer positioning guides be used. For example, in the example of the method of the present disclosure shown in FIGS. 2A, 2B, and 2C, three positioning guides are used.

Furthermore, the positioning guide may be constituted by a material which is insulative to the battery and ions, or may be coated with such an insulative material.

The shape of the positioning guide is not particularly limited and may be, for example, prismatic or cylindrical.

Furthermore, the positioning guide may be mounted to a bottom plate. The bottom plate may be constituted by a material which is insulative to the battery and ions, or may be coated with such an insulative material. Further, the positioning guide and the bottom plate can form a part of the case of the laminate-type battery.

Note that in the method of the present disclosure, when forming a laminate-type all-solid-state battery, as described later, after arranging a first current collector layer, a first active material layer, a solid electrolyte layer, a second active material layer, and a second current collector layer in this order in accordance with the desired number of layers, a step in which the layers are restrained in the lamination direction may be further included. As a result, when charging and discharging, the conductivity of ions and electrons within and between each layer of the all-solid-state battery laminate can be improved to further promote the battery reaction.

Furthermore, the produced laminate-type battery may be assembled with an external body such as a cannister.

<<Laminate-Type Battery>

The laminate-type battery of the present disclosure, which is produced in accordance with the method described above, comprises a first current collector layer, a first active material layer, a solid electrolyte layer or a separator layer, a second active material layer, and a second current collector layer laminated in this order.

The laminate-type battery may be an all-solid-state battery or may be a liquid battery. Thus, the laminate-type battery of the present disclosure may be a laminate-type all-solid-state battery comprising a first current collector layer, a first active material layer, a solid electrolyte layer, a second active material layer, and a second current collector layer laminated in this order, or may be a laminate-type liquid battery comprising a first current collector layer, a first active material layer, a separator layer, a second active material layer, and a second current collector layer laminated in this order.

Furthermore, the "first active material layer" and the "second active material layer" are not particularly limited as long as they are different active material layers. For example, if the "first active material layer" is a positive electrode active material layer, the "second active material layer" is a negative electrode active material layer. Likewise, if the "first active material layer" is a negative electrode active material layer, the "second active material layer" is a positive electrode active material layer. Further, the "first current collector layer" corresponds to the first active material layer, the "second current collector layer" corresponds to the second active material layer.

Specific examples of the structures of a positive electrode current collector layer, a positive electrode active material layer, a solid electrolyte layer, a negative electrode active material layer, a negative electrode current collector layer, and a separator layer will be described. Note that, though an example in which an all-solid-state lithium secondary battery is used is described for the ease of understanding of the present disclosure, the laminate-type battery of the present disclosure is not limited to all-solid-state lithium secondary batteries, but rather, can be widely applied.

(Positive Electrode Current Collector Layer)

The conductive material used in the positive electrode current collector layer is not particularly limited, and any material which can be used in all-solid-state batteries can be appropriately used. For example, the conductive material of the positive electrode current collector layer may be SUS, aluminum, copper, nickel, iron, titanium, or carbon. However, the conductive material is not limited thereto.

The form of the positive electrode current collector layer is not particularly limited and can be, for example, a foil, a plate, or a mesh. Among these, a foil is preferable.

(Positive Electrode Active Material Layer)

The positive electrode active material layer includes at least a positive electrode active material, and preferably further includes a solid electrolyte, which will be described later. In addition thereto, additives which are used in the positive electrode active material layers of all-solid-state batteries, such as a conductive aid or binder, can be included in accordance with the intended application or purpose.

The material of the positive electrode active material is not particularly limited. For example, the positive electrode active material may be lithium cobalt oxide ($LiCoO_2$), lithium nickel oxide ($LiNiO_2$), lithium manganate ($LiMn_2O_4$), $LiCo_{1/3}Ni_{1/3}Mn_{1/3}O_2$, or a heterogeneous-element-substituted Li—Mn spinel represented by $Li_{1+x}Mn_{2-x-y}M_yO_4$ (wherein M is at least one metal element selected from Al, Mg, Co, Fe, Ni and Zn). However, the material of the positive electrode active material layer is not limited thereto.

The conductive aid is not particularly limited. For example, the conductive aid may be a carbon material, such as VGCF (vapor grown carbon fiber) or carbon nanofibers, or a metal material. However, the conductive aid is not limited thereto.

The binder is not particularly limited. For example, the binder may be a material such as polyvinylidene fluoride (PVdF), carboxymethyl cellulose (CMC), butadiene rubber (BR), styrene butadiene rubber (SBR), or combinations thereof. However, the binder is not limited thereto.

(Solid Electrolyte Layer)

The solid electrolyte layer includes at least a solid electrolyte. The solid electrolyte is not particularly limited and any material commonly used as the solid electrolyte in all-solid-state batteries can be used. For example, the solid electrolyte may be a sulfide solid electrolyte, oxide solid electrolyte, or polymeric electrolyte. However, the solid electrolyte is not limited thereto.

Examples of the sulfide solid electrolyte include sulfide-based amorphous solid electrolytes, sulfide-based crystalline solid electrolytes, or aldylodyte-type solid electrolytes. However, the sulfide solid electrolyte is not limited thereto. Examples of specific sulfide solid electrolytes include $Li_2S$—$P_2S_5$-type compounds (such as $Li_7P_3S_{11}$, $Li_3PS_4$, or $Li_8P_2S_9$), $Li_2S$—$SiS_2$, $LiI$—$Li_2S$—$SiS_2$, $LiI$—$Li_2S$—$P_2S_5$, $LiI$—$LiBr$—$Li_2S$—$P_2S_5$, $Li_2S$—$P_2S_5$—$GeS_2$ (such as $Li_{13}GeP_3S_{16}$ or $Li_{10}GeP_2S_{12}$), $LiI$—$Li_2S$—$P_2O_5$, $LiI$—$Li_3PO_4$—$P_2S_5$, $Li_{7-x}PS_{6-x}Cl_x$, and combinations thereof. However, the sulfide solid electrolyte is not limited thereto.

Examples of the oxide solid electrolyte include $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3}$—$TiO_3$, $Li_{1+x}Al_xTi_{2-x}(PO_4)_3$, $Li_{1+x}Al_xGe_{2-x}(PO_4)_3$, $Li_3PO_4$, and $Li_{3+x}PO_{4-x}N_x$ (LiPON). However, the oxide solid electrolyte is not limited to these materials.

(Polymeric Electrolyte)

Examples of the polymeric electrolyte include polyethylene oxide (PEO), polypropylene oxide (PPO), and copolymers thereof. However, the polymeric electrolyte is not limited thereto.

The solid electrolyte may be a glass or a crystallized glass (glass ceramic). Furthermore, in addition to the above-described solid electrolytes, the solid electrolyte layer may include a binder as necessary. Specific examples thereof are the same as the "binders" described above for the "positive electrode active material layer", and thus, descriptions thereof have been omitted.

(Negative Electrode Active Material Layer)

The negative electrode active material layer includes at least a negative electrode active material and preferably further includes a solid electrolyte as described above. In addition thereto, depending on the purpose or application thereof, for example, additives commonly used in the negative electrode active material layer of all-solid-state batteries, such as a conductive aid or binder, can be included.

The material of the negative electrode active material is not particularly limited, and is preferably capable of occluding and releasing metal ions such as lithium ions. For example, the negative electrode active material may be an alloy-based negative electrode active material or a carbon material. However, the material of the negative electrode active material layer is not limited thereto.

The alloy-based negative electrode active material is not particularly limited, and, for example, a Si alloy-based negative electrode active material or a Sn alloy-based negative electrode active material can be used. The Si alloy-based negative electrode active material can be silicon, silicon oxide, silicon carbide, silicon nitride, or a solid solution thereof. Furthermore, the Si alloy-based negative electrode active material can include an element other than silicon, such as Fe, Co, Sb, Bi, Pb, Ni, Cu, Zn, Ge, In, Sn, or Ti. The Sn alloy-based negative electrode active material can be tin, tin oxide, tin nitride, or a solid solution thereof. Furthermore, the Sn alloy-based negative electrode active material can include an element other than tin, such as Fe, Co, Sb, Bi, Pb, Ni, Cu, Zn, Ge, In, Ti, or Si. Among these, a Si alloy-based negative electrode active material is preferable.

The carbon material is not particularly limited and can be, for example, a hard carbon, a soft carbon, or graphite.

Regarding the solid electrolyte and other additives such as the conductive aid and binder used in the negative electrode active material layer, those described above in the sections "positive electrode active material layer" and "solid electrolyte layer" can be appropriately used.

(Negative Electrode Current Collector Layer)

The conductive material used in the negative electrode current collector layer is not particularly limited, and any material commonly used in all-solid-state batteries can be appropriately used. For example, the conductive material used in the negative electrode current collector layer may be SUS, aluminum, copper, nickel, iron, titanium, or carbon. However, the conductive material is not limited thereto.

The form of the negative electrode current collector layer is not particularly limited and can be, for example, a foil, a plate, or a mesh. Among these, a foil is preferable.

(Separator Layer)

The separator layer may be an electrically insulating non-woven fabric or porous film. Examples of the porous film include films consisting of a resin such as polyethylene (PE) or polypropylene (PP).

REFERENCE SIGNS LIST 1 first layer
2 second layer
3 laminate of first current collector layer and first active material layer
4 solid electrolyte layer
5 laminate of second current collector layer and second active material layer
11 positioning guide
11a, 12a, 13a, 14a first contact surface
11b, 12b, 13b, 14b second contact surface
12c, 13c, 14c third contact surface
21, 22 bottom plate

The invention claimed is:

1. A method for producing a laminate-type battery comprising a first current collector layer, a first active material layer, a solid electrolyte layer or a separator layer, a second active material layer, and a second current collector layer laminated in this order, the method comprising:
    arranging a first layer along a first contact surface of a positioning guide, rotating the positioning guide, and thereafter arranging a second layer on the arranged first layer along a second contact surface of the positioning guide, wherein
    the first layer and the second layer are different from each other and comprise an arbitrary layer selected from the first current collector layer, the first active material layer, the solid electrolyte layer or the separator layer, the second active material layer, and the second current collector layer, and
    wherein the positioning guide is different from the separator layer.

2. The method according to claim 1, wherein at least one of the first layer and the second layer is a laminate of the first current collector layer and the first active material layer or a laminate of the second current collector layer and the second active material layer.

3. The method according to claim 1, comprising arranging the first layer, the second layer, and a third layer along the positioning guide in this order, wherein
    the first layer is arranged along the first contact surface of the positioning guide, and the positioning guide is rotated, thereafter
    the second layer is arranged on the arranged first layer along the second contact surface of the positioning guide, and the positioning guide is rotated, subsequently
    the third layer is arranged on the arranged second layer along a third contact surface of the positioning guide, and wherein
    the third layer is different from the first layer and the second layer, and comprises an arbitrary layer selected from the first current collector layer, the first active material layer, the solid electrolyte layer or the separator layer, the second active material layer, and the second current collector layer.

4. The method according to claim 3, wherein the first layer is a laminate of the first current collector layer and the first active material layer,
    the second layer is the solid electrolyte layer or the separator layer, and the third layer is a laminate of the second current collector layer and the second active material layer.

5. The method according to claim 1, further comprising cleaning the contact surfaces of the positioning guide.

6. The method according to claim 5, wherein the cleaning is carried out by a contact method or a non-contact method.

7. The method according to claim 1, wherein two or more positioning guides are used.

8. The method according to claim 1, wherein three positioning guides are used.

9. The method according to claim 1, wherein the positioning guide is mounted on a bottom plate, and
the positioning guide and the bottom plate form a part of a case of the laminate-type battery.

10. The method according to claim 1, wherein the positioning guide is removed after the arranging step.

11. The method according to claim 1, wherein the positioning guide rotates around a longitudinal axis parallel to the laminating direction.

12. The method according to claim 11, wherein the positioning guide is in the form of a pole having a prismatic or cylindrical shape.

13. The method according to claim 1, wherein each contact surface of the positioning guide contacts an edge of a respective layer.

14. The method according to claim 1, wherein the positioning guide is different from the first current collector layer, the first active material layer, the solid electrolyte layer, the second active material layer, and the second current collector layer.

* * * * *